…

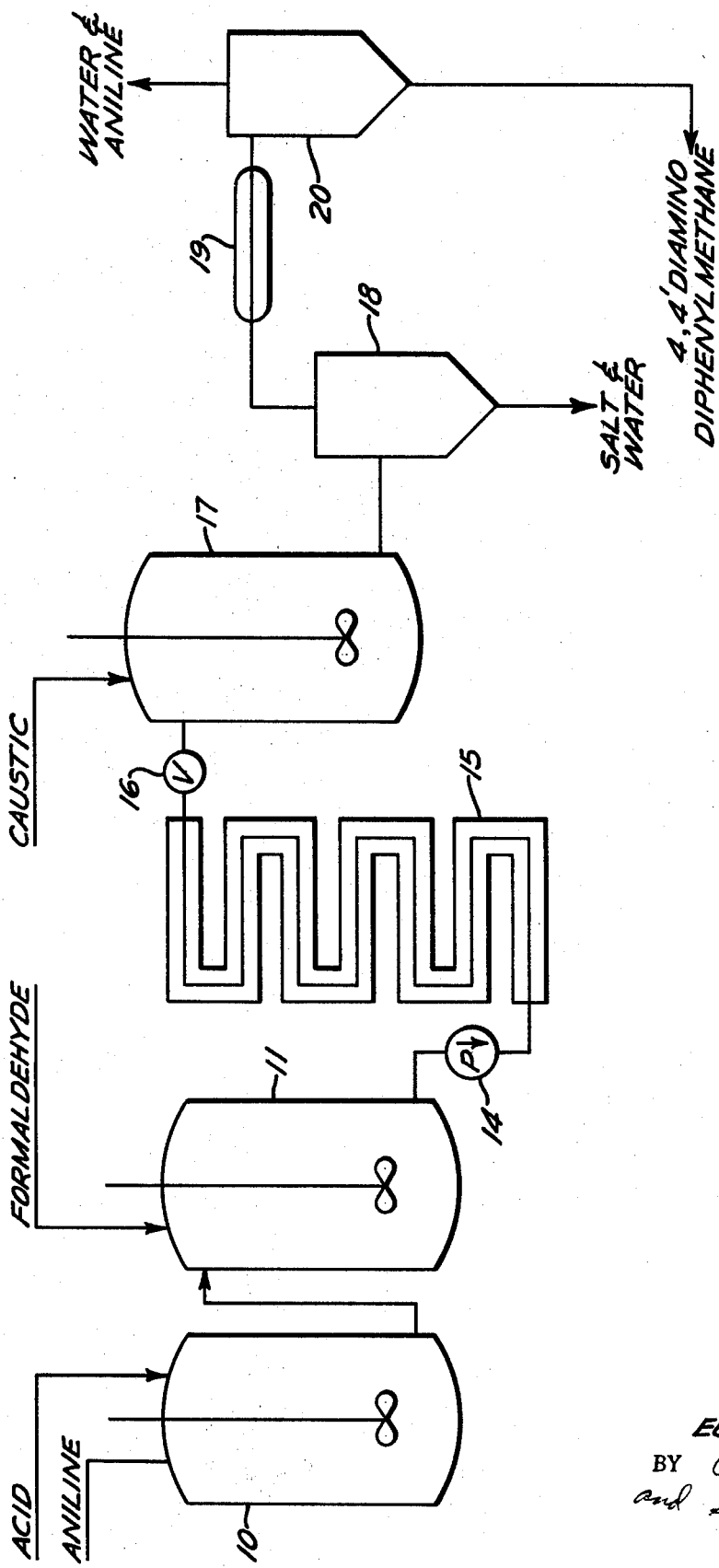

United States Patent Office 3,517,062
Patented June 23, 1970

3,517,062
PROCESS FOR THE PREPARATION OF SUBSTANTIALLY PURE 4,4'-DIAMINODIPHENYLMETHANE
Eugene L. Powers, New Martinsville, W. Va., assignor to Mobay Chemical Company, Pittsburgh, Pa., a corporation of Delaware
Filed Aug. 5, 1966, Ser. No. 570,476
Int. Cl. C07c 85/08
U.S. Cl. 260—570     5 Claims

ABSTRACT OF THE DISCLOSURE

A method for preparing an aromatic primary amine having at least 96% of the diamine content present as the 4,4'-isomer is disclosed which comprises reacting aniline with formaldehyde in proportions of from about 1.4 to about 6 mols of aniline per mol of formaldehyde, in the presence of at least enough acid catalyst to maintain the system in a single organic phase, at a temperature of about 110° C. to about 160° C. for less than 30 minutes.

This invention relates to the preparation of 4,4'-diaminodiphenylmethane and more particularly to the preparation of a product which contains very little impurity.

It has been proposed heretofore in the preparation of 4,4'-diaminodiphenylmethane to prepare a product having a high proportion of the 4,4'-isomer by reacting the product at a temperature of up to about 100° C. for long periods of time of 2 to 4 hours. The use of higher temperatures for the condensation of formaldehyde with aniline in order to prepare diaminodiphenylmethane has also been proposed, for example, in Belgium Pat. 648,787. However, the product of the Belgium patent is prepared in the presence of from 0.1 to 12 percent of theory of the hydrochloric acid required to react with the aniline. In the presence of such low amounts of acid and even at temperatures higher than 105° C. as proposed in the Belgium patent the diamine products contain substantial proportions of the 2,4'-isomer. As much as 60 percent of the isomers present may be 2,2'- or 2,4'-isomer when a product is desired which has more than 96 percent of the 4,4'-isomer.

It is, therefore, an object of this invention to provide a method for the preparation of substantially pure 4,4'-diaminodiphenylmethane without having to suffer the disadvantage of the long reaction times which were heretofore necessary. Another object of this invention is to provide an improved process for the preparation of a product containing a high percentage of 4,4'-diaminodiphenylmethane which will yield satisfactory isocyanates for sale in the trade which uses them in the production of urethane elastomers and spandex threads. Still another object of this invention is to provide an improved process for the preparation of 4,4'-diaminodiphenylmethane which in turn can be phosgenated to prepare a product having at least 96 percent 4,4'-diisocyanato diphenylmethane.

The foregoing objects and others which will become apparent from the following description are accomplished in accordance with the invention, generally speaking, by providing a method of preparing an aromatic primary amine having at least 96 percent of the diamine content present as the 4,4'-isomer wherein aniline is reacted with formaldehyde in the proportions of about 1.4 to 6 mols of aniline per mol of formaldehyde, in the presence of sufficient acid to maintain a single organic phase, for a period of time less than about 30 minutes and preferably from about 15 seconds to about 5 minutes at a temperature within the range of about 110° C. to about 160° C. Thus, the present invention contemplates an improved method for preparing substantially pure 4,4'-diaminodiphenylmethane wherein the aniline and formaldehyde are mixed in the proportions set forth above and reacted for a short time, preferably less than about 5 minutes but at least about 15 seconds, at a temperature of from about 110° C. to about 160° C. and preferably at a temperature of from about 125° C. to about 150° C. When the process of the invention is followed it is possible to prepare a product which consistently has 96 percent or more of the diamine content present as the 4,4'-isomer. The minimum amount of hydrochloric acid required to maintain a single phase can be approximated by the following equation:

$$\text{Mols of HCl} = \frac{\text{mols of aniline} \left( \frac{\text{weight of H}_2\text{O}}{\text{weight of aniline}} \right)^{0.56}}{3.26}$$

In accordance with a preferred embodiment of the invention a solution of aniline and HCl in a molar ratio of 0.75 to about 1.0 mol of HCl/mol of aniline is added to an agitated kettle. To this solution a formaldehyde solution is added at one or several points and the temperature controlled to about 60 to 80° C. The weight ratio of water to aniline should not be less than about 0.9 (water is understood to be that added with any reactants plus the water of condensation). Following the formaldehyde solution addition, the initial reaction mixture is passed through a continuous reactor where reaction is allowed to occur at from about 110 to about 160° C. for less than about 30 minutes. It is desirable to be able to carry out the reaction in the continuous reactor in less than 5 minutes and this is possible particularly if means are provided for pumping the mixture of aniline, formaldehyde and acid through a pressurized continuous reactor pipe which is jacketed to provide heat so that the reactants are at a temperature within the range of about 110 to about 160° C. and then conducting the reaction mixture through a let-down valve. If desired, one may prereact the aniline with the calculated amount of the acid in order to prepare the aniline salt which is then mixed with formaldehyde and conducted through the continuous heated zone. The process of the invention is also applicable, however, to batch preparation of the 4,4'-diaminodiphenylmethane and need not be carried out on a continuous basis except that this is the most advantageous way to carry out the process of the invention. It is not necessary either to use hydrochloric acid as the acid catalyst although it is preferred. Any other suitable acid may be used which will catalyze the reaction of the aniline with the formaldehyde, including the strong Lewis acids which have a pKa less than 2. "PKa" as used herein is as defined in "Inorganic Chemistry, An Advanced Textbook" by Therald Moeller, 1955, pages 312–315, as the negative logarithm of the equilibrium (or dissociation) constant of the acid. As described herein pKa refers to a water solution of the acid at 25° C.

Suitable acid catalysts include, for example, hydrochloric acid, sulphuric acid, ortho-phosphoric acid and the like.

It can be seen from the foregoing that the process of the invention involves the straightforward and continuous reaction of aniline with formaldehyde in the proportions set forth above. It is, however, essential to the invention that there be at least about .25 mol of acid present per mol of aniline so that there is a sufficient amount of acid present in order to give a single reaction phase thus allowing control of the produced 4,4'-isomer. There should be at least 25 percent of the acid present to react with the aniline, preferably at least 50 percent and it is most preferred to have 75 to 100 percent of the acid required to react with the aniline. In addition, the proportions of aniline to formaldehyde are important. There should be 1.4 to 6 mols of aniline present per mol of formaldehyde and it is still better to have from 1.5 to 4 mols of aniline present per mol of formaldehyde. In addition, the reaction time is important. Reaction times of more than 30 minutes have no advantage in producing more of the 4,4′-isomer. If the reaction time is kept below 30 minutes and preferably below 5 minutes the major proportion of the yield based on the charge of aniline and formaldehyde will be diamine and in turn will be at least 96 percent of the 4,4′-isomer, provided all of the other conditions set forth above are met.

The reaction may be conveniently carried out in an apparatus like that shown in the attached drawing wherein the aniline, the formaldehyde and the acid are mixed in reactors 10 and 11 and then passed by pump 14 to a jacketed continuous reactor 15 where the reaction mixture is maintained at a temperature of 110 to 160° C. for a time of less than 30 minutes and preferably less than 5 minutes. The product is then released through let-down valve 16 to a neutralizer 17 where the material is neutralized by reaction with a base (in the case of hydrochloric acid or sulphuric acid, sodium hydroxide may be used) and then passed to a separator 18 where the salt water is separated. The amine is then fed through pipe still 19 to separator 20 where water and aniline is taken off overhead and where a crude polyamine containing the substantially pure 4,4′-isomer of diaminodiphenylmethane is recovered as product, i.e. having 75 percent diamine which is substantially the 4,4′-isomer, and 25 percent polyamines.

The diaminodiphenylmethane produced in accordance with the present invention is suitable for reaction with phosgene to prepare 4,4′-diisocyanato diphenylmethane, which in turn is useful for the preparation of polyurethane plastics including polyurethane foam and polyurethane elastomers. The elastomers based on 4,4′-diisocyanato diphenylmethane are particularly useful for the preparation of spandex threads which have found utility as textiles and particularly in the undergarment industry.

The invention is further illustrated by the following examples in which the parts are by weight unless otherwise indicated. The examples are carried out in apparatus like that illustrated in the accompanying drawing. Referring to the drawing, hydrochloric acid in the amount indicated in the following table and aniline are introduced into reactor 10 and then pumped to reactor 11 where formaldehyde is added in such a proportion that there are about 3 mols of aniline, aniline hydrochloride per mol of formaldehyde and then the mixture of aniline, aniline hydrochloride and formaldehyde are pumped by pump 14 through jacketed reactor 15 where the residence time is a shown in the table. Jacketed reactor 15 is under a pressure of about 100 p.s.i. and the reaction mixture containing product is released through let-down valve 16 into a tank where it is neutralized with a stoichiometric amount of sodium hydoxide. The product, the salt and by-products are then conducted to separator 18 where the salt water is removed. Excess aniline and water are removed by way of pipe still 19 and separator 20 so as to form 4,4′-diaminodiphenylmethane. The overall yield of diamine based on the charge of reactants and the isomeric distribution in the diamine are shown also in the following table.

| Example No. | HCl, percent of Theory | Temp, °C. | Time, min. | Diamine yield, percent | Isomer distribution 4,4′-percent | 2,2′-percent | 2,4′-percent | Amino benzyl anilino intermediates, percent |
|---|---|---|---|---|---|---|---|---|
| 1 | 100 | 100 | 120 | 83.8 | 97 | 0.35 | 2.5 | 0.15 |
| 2 | 100 | 110 | 5 | 83.6 | 97 | 0.4 | 2.5 | 0.06 |
| 3 | 40 | 100 | 180 | 75.4 | 95 | 0.5 | 4.5 | 0.02 |
| 4 | 40 | 110 | 5 | 72.1 | 95.6 | 0.2 | 3.8 | 0.35 |
| 5 | 100 | 100 | 30 | 75.6 | 52.7 | 0.1 | 5.2 | 42.0 |
| 6 | 100 | 110 | 30 | 77.2 | 94.9 | 0.1 | 5.0 | 0.04 |
| 7 | 75 | 100 | 135 | 81.9 | 93.0 | 0.1 | 6.7 | 0.18 |
| 8 | 75 | 125 | 5 | 82.3 | 93.6 | 0.1 | 6.1 | 0.17 |
| 9 | 100 | 125 | 5 | 83.9 | 97 | 0.36 | 2.5 | 0.14 |
| 10 | 100 | 150 | 5 | 83.7 | 96.4 | 0.5 | 3.1 | 0.01 |
| 11 | 100 | 150 | 1 | 83.1 | 96.6 | 0.5 | 2.9 | 0.02 |

In the foregoing table the percentage of hydrochloric acid is the percentage of the theory required to react with all of the aniline. The reaction temperature is the temperature in reactor 15 and the time is the residence time in reactor 15. The yield is percent diamine based on the total condensation product.

It is to be understood that the foregoing examples are given for the purpose of illustration and that any other suitable acid reaction time, proportion of catalyst, reaction temperature or the like could have been used therein provided that the teachings of this disclosure are followed.

Although the invention has been described in considerable detail for purpose of illustration, it is to be understood that variations can be made by those skilled in the art without departing from the spirit of the invention and scope of the claims.

What is claimed is:

1. A method of preparing an aromatic primary amine having at least 96 percent of the diamine content present as the 4,4′-isomer which comprises reacting aniline with formaldehyde in proportions of about 1.4 to 6 mols of aniline per mol of formaldehyde, in the presence of at least enough acid catalyst to maintain the system in a single organic phase, for less than 30 minutes at a temperature of about 110 to about 160° C.

2. The method of claim 1 wherein said acid is a Lewis acid having a pKa less than 2.

3. The method of claim 1 wherein from about 1.5 to 4 mols of aniline are present per mol of formaldehyde.

4. The method of claim 1 wherein the reaction time is less than 5 minutes.

5. The method of claim 1 wherein from about 1.5 to about 4 mols of aniline are present per mol of formaldehyde, said acid has a pKa of less than 2, the reaction time is less than 5 minutes and the reaction temperature is within the range of from about 125° C. to about 145° C.

References Cited

UNITED STATES PATENTS 3,274,247  9/1966  Repper _____ 260—570
3,297,759  1/1967  Curtis et al. _____ 260—570
3,367,969  2/1968  Perkins _____ 260—570

ROBERT V. HINES, Primary Examiner

U.S. Cl. X.R.

260—453, 510.9, 77.5